T. H. BROWN.
NUT LOCK.
APPLICATION FILED JUNE 23, 1921.
1,424,277. Patented Aug. 1, 1922.
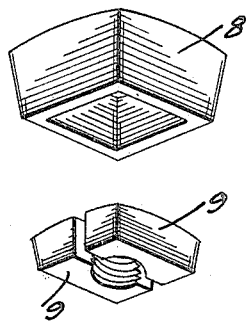
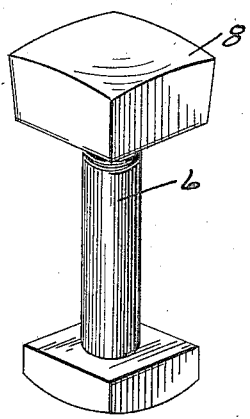
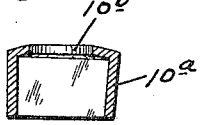
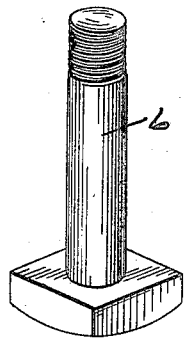
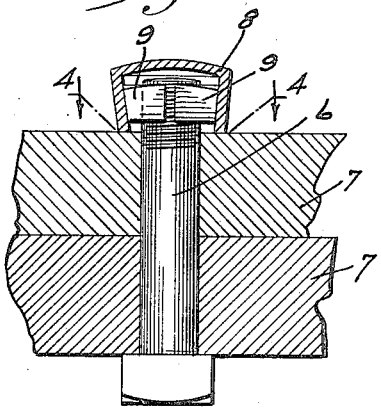
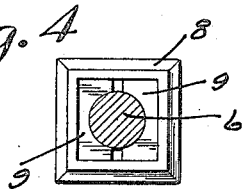
Inventor
Theodore H. Brown
By his Attorneys
Merchant Kilgore & Kilgore

UNITED STATES PATENT OFFICE.

THEODORE H. BROWN, OF MINNEAPOLIS, MINNESOTA, ASSIGNOR, BY DIRECT AND MESNE ASSIGNMENTS, OF ONE-THIRD TO CHARLES E. OVENSHIRE, ONE-THIRD TO JOHN C. MacDONALD, AND ONE-THIRD TO EDWARD C. OVENSHIRE, ALL OF MINNEAPOLIS, MINNESOTA.

NUT LOCK.

1,424,277.      Specification of Letters Patent.      Patented Aug. 1, 1922.

Application filed June 23, 1921. Serial No. 479,788.

*To all whom it may concern:*

Be it known that I, THEODORE H. BROWN, a citizen of the United States, residing at Minneapolis, in the county of Hennepin and State of Minnesota, have invented certain new and useful Improvements in Nut Locks; and I do hereby declare the following to be a full, clear, and exact description of the invention, such as will enable others skilled in the art to which it appertains to make and use the same.

My invention has for its object to provide an improved nut lock and, to such ends, generally stated, the invention consists of the novel construction and combinations of parts hereinafter described and defined in the claim.

The improved nut lock or lock nut is made up of a cap and a two-part nut, so that the complete lock nut, when applied, has the appearance of a cap nut.

The invention is illustrated in the accompanying drawings, wherein like characters indicate like parts throughout the several views.

Referring to the drawings:

Fig. 1 is a perspective showing a bolt having one of my improved nut locks applied thereto;

Fig. 2 is a view corresponding to Fig. 1, but showing the elements of the nut lock separated and removed from the bolt;

Fig. 3 is a view partly in plan and partly in section showing the bolt and nut illustrated in Fig. 1 applied to clamp two plates together;

Fig. 4 is a section on the line 4—4 of Fig. 3, looking upward; and

Fig. 5 is an axial section illustrating a slightly modified form of the lock nut cap.

The numeral 6 indicates an ordinary threaded bolt, which, in Fig. 3, is applied to clamp together two plates 7.

The lock nut comprises a cap 8 and a two-part nut 9. The nut sections 9 may be produced in various different ways, as, for example, by sawing into an ordinary nut. The nut cap 8 is preferably a stamped steel shell, which, for square nuts, would be made of rectangular contour. One or more of the walls of the cap 8 are obliquely set in respect to the axis of the nut and bolt, so that two opposing sides of the cap are made to converge toward the bottom or open side of the cap. Preferably, also, the nut sections would be correspondingly beveled, and they are, of course, of such size that when applied to the bolt and within the cap, they cannot be drawn out of the cap.

When the complete nut is applied to a bolt as shown in the drawings and the nut is screwed onto the bolt, the nut sections will be very tightly clamped against the threaded end of the bolt when the nut is tightened against the objects to be clamped together. Thus, such friction is produced between the threads of the bolt and nut that there is no possibility or probability of the nut becoming accidentally loosened. However, the nut may be screwed off and reapplied, without damage to the threads of the nut or bolt, by the application of sufficient force in the proper direction.

In the form of cap shown in Fig. 5, only one wall of the cap $10^a$ is obliquely set, but the cap, in its crown, is formed with a hole $10^b$ through which the threaded end of the bolt may project.

In the form of lock nut shown in Figs. 1 to 4, inclusive, the convergence of the sides of the cap is such that the nut sections will not fall out of the cap accidentally even when the nut is removed from the bolt.

The efficiency of this nut lock or lock nut has been demonstrated in actual practice.

What I claim is:

A nut lock comprising a cap and a two-part nut within said cap, said cap having walls that converge toward its open side and operate to press the nut sections against the threaded end of a bolt to which they are applied, the convergence of the wall of said cap being such that the nut sections will not accidentally fall out of the cap when removed from the bolt.

In testimony whereof I affix my signature.

THEODORE H. BROWN.